US012606132B2

(12) United States Patent
van Thiel

(10) Patent No.: US 12,606,132 B2
(45) Date of Patent: Apr. 21, 2026

(54) METHOD FOR ACTUATING A VEHICLE BRAKE SYSTEM OF A VEHICLE, AND TOWING VEHICLE

(71) Applicant: ZF CV Systems Global GmbH, Bern (CH)

(72) Inventor: Julian van Thiel, Grossburgwedel (DE)

(73) Assignee: ZF CV Systems Global GmbH, Bern (CH)

( * ) Notice: Subject to any disclaimer, the term of this patent is extended or adjusted under 35 U.S.C. 154(b) by 307 days.

(21) Appl. No.: 18/461,296

(22) Filed: Sep. 5, 2023

(65) Prior Publication Data

US 2023/0415713 A1     Dec. 28, 2023

Related U.S. Application Data

(63) Continuation of application No. PCT/EP2022/055118, filed on Mar. 1, 2022.

(30) Foreign Application Priority Data

Mar. 24, 2021     (DE) ..................... 10 2021 107 303.0

(51) Int. Cl.
*B60T 7/20* (2006.01)
*B60T 8/17* (2006.01)

(52) U.S. Cl.
CPC .............. *B60T 7/20* (2013.01); *B60T 8/1708* (2013.01); *B60T 2230/06* (2013.01)

(58) Field of Classification Search
CPC ....... B60T 7/20; B60T 8/1708; B60T 2230/06
See application file for complete search history.

(56) References Cited

U.S. PATENT DOCUMENTS 5,986,544 A * 11/1999 Kaisers ................. B60T 13/683
280/504
2012/0025487 A1 2/2012 Kneer et al.
(Continued)

FOREIGN PATENT DOCUMENTS

DE 197 44 066 A1 4/1999
DE 199 55 798 A1 5/2001
(Continued)

OTHER PUBLICATIONS

International Search Report of the European Patent Office dated Jun. 20, 2022 for international application PCT/EP2022/055118 on which this application is based.
(Continued)

*Primary Examiner* — Xiao En Mo
(74) *Attorney, Agent, or Firm* — Walter Ottesen, P.A.

(57) ABSTRACT

A method is for actuating a vehicle brake system of a vehicle with a towing vehicle and a trailer that can be coupled. The towing vehicle has a trailer interface via which interface signals can be transmitted between the towing vehicle and the coupled trailer. The method includes: reading a sensor signal from a vehicle sensor, determination and provision of a monitoring result by evaluating the sensor signal, wherein the monitoring result indicates whether or not at least one trailer is coupled, wherein the sensor signal and/or the monitoring result is/are determined independently of the interface signals acting on the trailer interface and/or transmitted via the trailer interface in the case of a coupled trailer; selecting a braking strategy depending on the monitoring result and/or the sensor signal, and actuating the vehicle brake system of the vehicle depending on the selected braking strategy when there is a braking demand.

20 Claims, 4 Drawing Sheets

(56) References Cited

U.S. PATENT DOCUMENTS

| | | | |
|---|---|---|---|
| 2016/0257289 | A1 | 9/2016 | Barth et al. |
| 2019/0084537 | A1* | 3/2019 | Kasper ................ B60T 8/17551 |

FOREIGN PATENT DOCUMENTS

| | | |
|---|---|---|
| DE | 10 2010 038 766 A1 | 2/2012 |
| DE | 10 2013 106 875 A1 | 1/2015 |
| DE | 10 2013 019 240 A1 | 6/2015 |
| EP | 3 266 661 A1 | 1/2018 |

OTHER PUBLICATIONS

English translation and Written Opinion of the International Searching Authority dated Jun. 20, 2022 for international application PCT/EP2022/055118 on which this application is based.

* cited by examiner

6

S6

29

30

12: y

12: n

18z
S1

18 (12)
18ga
S1,S2(FD,N,T.i(M))
T.i(AB,AK,AN,AS,AZ)

19/19s(18ga)
32: S1, S2(18)

SK1

SK2

SK3

SK4

METHOD FOR ACTUATING A VEHICLE BRAKE SYSTEM OF A VEHICLE, AND TOWING VEHICLE

CROSS-REFERENCE TO RELATED APPLICATIONS

This application is a continuation application of international patent application PCT/EP2022/055118, filed Mar. 1, 2022, designating the United States and claiming priority from German application 10 2021 107 303.0, filed Mar. 24, 2021, and the entire content of both applications is incorporated herein by reference.

TECHNICAL FIELD

The present disclosure relates to a method for actuating a vehicle brake system of a vehicle, wherein the vehicle has at least one towing vehicle and at least one trailer can be coupled to the towing vehicle. Further, the present disclosure relates to a towing vehicle with a towing vehicle brake system for carrying out the method.

BACKGROUND

For the safety of road users, a vehicle itself and to comply with legal requirements, safe and efficient braking of the vehicle must be ensured. In particular, in the case of vehicles equipped with an electro-pneumatic brake system without trailer stability control, it is necessary to know whether the vehicle consists of only a towing vehicle or whether the vehicle consists of a towing vehicle and at least one trailer coupled to the towing vehicle in order to brake safely and efficiently. For example, in the case of a vehicle consisting of a towing vehicle and a trailer without its own trailer stability control, care must be taken to ensure that the trailer does not swerve when braking the combination vehicle. This is usually achieved by braking less hard than in a vehicle consisting of only a towing vehicle, which in turn results in a longer braking distance.

If heavy braking is required, such as emergency braking, a braking strategy is sought with which the shortest possible braking distance can be achieved while the vehicle is still controllable. For the case in which the vehicle is steered and braked by a human driver, the driver can, for example, take the driving behavior or driving dynamics of a coupled trailer into account by looking into the side mirror of the towing vehicle and can adjust his braking strategy accordingly.

Furthermore, modern vehicles usually have electronic brake systems (EBS), driver assistance systems or stability control systems (ABS, ESC, ASR, RSC, et cetera) and emergency brake systems, which are set up for automated or semi-automated braking of the vehicle in order to brake it autonomously, taking into account instabilities, or to support the driver. Here both the towing vehicle and the trailer can have corresponding automated or semi-automated braking and/or driver assistance systems. In the event that the vehicle has such automated or semi-automated systems that also intervene during braking, the full braking potential can be exploited when braking the towing vehicle or the trailer, as possible instabilities can be corrected accordingly.

In order to brake the vehicle efficiently, it must be determined beforehand with sufficient certainty whether the vehicle consists of only a towing vehicle or whether the vehicle consists of a towing vehicle and at least one trailer. If a trailer is not actively detected, it is always assumed for safety purposes that the vehicle consists of a towing vehicle and at least one trailer, as the non-detection could occur due to a defective connection to the trailer. For example, it may be the case that the (radio) connection/plug connection required for communication between the towing vehicle and the trailer, for example PLC (Power Line Communication) or Trailer CAN (ISO 11992), is not activated/plugged in, or there could be any other defect of a communication component in the towing vehicle or trailer.

Since it can be assumed in this case that there is no trailer stability control due to a possibly defective connection, the vehicle must be braked with an appropriately selected and adapted braking strategy, wherein with the braking strategy based on a lacking or faulty stability control the full braking potential is not called up. However, in the case in which the vehicle actually only consists of a towing vehicle, this leads to the disadvantage of an unnecessarily long braking distance. At the same time, braking power is saved for braking a trailer that is actually not present.

SUMMARY

Against this background, it is an object of the disclosure to enable safe and efficient braking of a vehicle, in particular for a vehicle including only one towing vehicle.

This objective is, for example, achieved by a method for actuating a vehicle brake system of a vehicle, the vehicle having at least one towing vehicle and at least one trailer configured to be coupled to the towing vehicle, the towing vehicle having a trailer interface, wherein interface signals are transmittable via the trailer interface between the towing vehicle and at least one coupled trailer. The method includes: reading at least one sensor signal from at least one vehicle sensor, wherein the vehicle sensor is configured to generate the sensor signal in dependence upon whether the at least one trailer is coupled or not; determining and providing a monitoring result by evaluating the sensor signal, wherein the monitoring result indicates whether or not the at least one trailer is coupled to the towing vehicle; wherein at least one of the sensor signal and the monitoring result is determined independently of the interface signals that at least one of act on the trailer interface and are transmitted via the trailer interface in a case of the at least one trailer being coupled; selecting a braking strategy in dependence upon at least one of the monitoring result and the sensor signal, wherein the braking strategy indicates how the vehicle brake system of the vehicle is actuated; and, actuating the vehicle brake system of the vehicle in dependence upon the selected braking strategy when there is a braking demand.

The object is, for example, also achieved by a towing vehicle including: a trailer interface, wherein at least one trailer is couplable to the towing vehicle such that interface signals are transmittable between the towing vehicle and the at least one coupled trailer via the trailer interface; at least one vehicle sensor configured to generate a sensor signal in dependence upon whether or not the at least one trailer is coupled to the towing vehicle; a monitoring unit configured to evaluate the sensor signal and, in dependence upon the evaluation of the sensor signal, to provide a monitoring result indicating whether or not the at least one trailer is coupled to the towing vehicle; wherein at least one of the sensor signal and the monitoring result can be determined independently of the interface signals which at least one of: can act on the trailer interface and can be transmitted via the trailer interface in a case of at least one coupled trailer; and, a towing vehicle brake system for braking the towing vehicle in dependence upon a braking demand and a braking strategy, wherein the braking strategy is selectable in dependence upon at least one of the monitoring result and the sensor signal.

According to the disclosure, a method for actuating a vehicle brake system of a vehicle is therefore provided, wherein the vehicle has at least a towing vehicle and at least one trailer can be coupled to the towing vehicle, wherein the towing vehicle has a trailer interface, wherein electrical and/or pneumatic and/or hydraulic interface signals can be transmitted via the trailer interface between the towing vehicle and at least one coupled trailer, with at least the following steps:

reading at least one sensor signal from at least one vehicle sensor, wherein the vehicle sensor is configured to generate the sensor signal depending on whether or not at least one trailer is coupled. The vehicle sensor can therefore initially be any sensor in the vehicle that interacts directly or indirectly with the at least one trailer;

determination and provision of a monitoring result by evaluating the sensor signal, wherein the monitoring result indicates whether or not at least one trailer is coupled to the towing vehicle, wherein the sensor signal and/or the monitoring result are generated or determined independently of the interface signals that act on the trailer interface and/or are transmitted via the trailer interface in the case of at least one coupled trailer. As a result it can advantageously be monitored whether a trailer is present without recourse to variables or signals transmitted during normal operation between the towing vehicle and the trailer concerned to ensure or implement brake operation. Thus, other sources can advantageously be used if, for example, the trailer interface to the trailer in question is defective or plug connections are deliberately or unknowingly not used correctly. Nevertheless, even in this case, for safe braking operation, it must be taken into account that the trailer in question is present, even if it can only be actuated to a limited extent, for example if trailer stability control is no longer available because the power supply to the respective trailer is interrupted;

selecting a braking strategy depending on the monitoring result and/or the sensor signal, wherein the braking strategy indicates how the brake system of the vehicle is actuated; and actuating the brake system of the vehicle depending on the selected braking strategy in the event of a fully automated or semi-automated or manual braking demand, for example.

According to the disclosure, a towing vehicle is further provided to which at least one trailer can be coupled and with which a method according to the disclosure can be carried out, wherein the vehicle thus formed may include a variety of configurations or designs. For example, the vehicle can be a semi-trailer with a fifth wheel, a truck-trailer combination with a drawbar coupling or a road train with a large number of the trailers. Different embodiments of the method are described below, each of which applies independently of each other to the method and the towing vehicle. In addition, the embodiments can be combined with each other.

The trailer interface of the towing vehicle is an interface via which, when a trailer is coupled to the towing vehicle, communication with the trailer in question is possible via an interface signal (electrical, hydraulic, pneumatic) or a control signal (electrical, hydraulic, pneumatic) can be transmitted. Communication can also be one-way or based solely on a reaction of the trailer concerned. The trailer interface can also be used to supply power to the at least one trailer, in particular to enable trailer stability control.

Electrical interface signals are transmitted, for example, by Power Line Communication (PLC) or via a Trailer CAN (ISO 11992) via the trailer interface, wherein the towing vehicle and the trailer in question can then normally actively exchange information via an electrical plug connection. An electrical interface signal is also transmitted via the trailer interface by measuring cold resistances of electrical components of the trailer (tail light, indicators, et cetera) by the towing vehicle or from the towing vehicle.

Another example of a pneumatic and/or hydraulic interface signal, which is normally transmitted via the trailer interface when a trailer is coupled, is a pneumatic or hydraulic control signal (trailer control signal) from the towing vehicle brake system to the trailer brake system in order to actively brake the trailer in question depending on the braking demand. If no trailer is coupled, the control signal is only fed to the trailer interface as an interface signal, that is, to its pneumatic control input.

Another example of an interface signal is an electrical and/or pneumatic or hydraulic test pulse fed to the trailer interface by the towing vehicle for testing the trailer interface. The reaction to such a test pulse is different with and without a trailer, since the interface signal acting on the trailer interface is transmitted or not, wherein the reaction can be evaluated by a pressure sensor or a corresponding sensor system in the towing vehicle or trailer.

On the basis of the interface signals mentioned above, it is at least possible to directly or indirectly draw a conclusion as to whether a trailer is coupled to the towing vehicle or whether no trailer is coupled to the towing vehicle, since these interface signals acting on the trailer interface are transmitted via the trailer interface or not, depending on the presence of a trailer.

The sensor signal according to the disclosure, which is used to determine the monitoring result, differs significantly from this interface signal, since it does not contain or does not take into account such a signal or is not dependent on such an interface signal that is or can be transmitted to the trailer in question. Therefore, a strict distinction must be made between these two signals. An evaluation of a variable dependent on the interface signal is therefore not mandatory, at least for the process sequence according to the disclosure. Thus, even without feeding or transmitting interface signals to or via the trailer interface to the trailer in question, a coupled trailer can be detected on the basis of the sensor signals alone. The interface signals can only be used in additional, supplementary detection steps, for example if the trailer detection according to the disclosure is to be extended and/or plausibility checked.

Preferably, it is provided that the at least one sensor signal is provided directly or indirectly by a vehicle sensor selected from the group consisting of:

a radar sensor and/or a camera and/or a lidar sensor and/or an ultrasonic sensor and/or an axle load sensor and/or a coupling sensor of an automated towing hitch and/or an articulation angle sensor system. Other sensors that can monitor a near field of the vehicle in order to draw conclusions about the presence of a trailer can also be used. The sensor signal can be provided directly from the vehicle sensor to a monitoring unit that undertakes the evaluation, or indirectly via an intermediate instance, such as a central control computer or central units of other systems in the vehicle, wherein the sensor signals can then be transmitted via the data bus of the vehicle, for example.

As a rule, modern vehicles already have such vehicle sensors, so that they can have a dual use in order to be able to draw conclusions about a coupled trailer. A trailer that is coupled to a towing vehicle is usually located in the rear area of the towing vehicle and thus in the surroundings of the towing vehicle that are detected by the respective sensors. If a vehicle consists of several trailers (road train), the respective trailers as part of the vehicle can also have corresponding vehicle sensors, which in turn can detect subsequent trailers without having to resort to interface signals to these trailers in question. This makes it possible to draw direct conclusions about one or more coupled trailers if, for example, a distance between the individual parts of the vehicle is monitored over a period of time via the sensors that detect the environment, especially when accelerating and/or braking the towing vehicle.

A radar sensor, ultrasonic sensor, lidar sensor or camera can be used to continuously determine the distance to objects in the environment of the vehicle, which is usually already used for a visual representation for the human driver, for automatic brake systems and/or control systems of autonomous vehicles in the vehicle. In addition, the sensor signals can then also be used to detect a trailer in the environment of the vehicle.

In principle, however, the vehicle sensor can also be a sensor in the environment that detects the surroundings of the subject vehicle, for example in parking lots, loading ramps or toll bridges. This enables the use of sensors that are not located in or on the vehicle, but which nevertheless map the surroundings of the vehicle. For example, it is conceivable that corresponding cameras have a better viewing angle or can more easily determine additional information such as a trailer type and/or a number of coupled trailers and can then make this information available to the evaluating monitoring unit in the vehicle.

An axle load sensor also provides a signal that is independent of the interface signals. If, for example, the towing vehicle is the towing vehicle of a semi-trailer, the coupling of a trailer or semi-trailer significantly changes the axle loads of the towing vehicle. As a result, the measured axle loads of the towing vehicle can in turn be used to draw conclusions as to whether or not a trailer is coupled to the towing vehicle.

A coupling sensor of an automated towing hitch also provides a signal that is independent of the aforementioned interface signals. For example, a sensor mounted in the coupling jaw of an automated towing hitch in the area of a coupling bolt, for example a touch sensor or an inductive proximity switch or a light barrier, is used for this purpose. The coupling sensor thus directly detects the presence of a coupling in the coupling jaw, which in turn allows conclusions to be drawn as to whether or not a trailer is coupled to the towing vehicle.

Depending on the type of the vehicle sensor, the respective processing units, in particular the monitoring unit, are set up, for example, to carry out image recognition, force evaluation or time profile determination of the sensor signal.

A variety of possibilities are conceivable as braking strategies, which are selected depending on a trailer being detected or undetected. A braking strategy is generally a strategy based on the braking forces and time profiles with which the individual brakes of the vehicle are braked in order to implement an existing braking demand. A braking demand can be, for example, the manual demand by a human driver via a control element, such as a brake pedal, or an automated demand via a braking demand signal, for example issued by an assistance system or stability control system (ABS, ESC, ASR, AEBS, et cetera) or a demand of a control computer of an autonomous vehicle.

The braking demand can preferably also be selected or modified depending on the braking strategy or the sensor signal or the monitoring result if, for example, a trailer without an existing or functional trailer ABS control system has been detected and instabilities can therefore be prevented from the towing vehicle by specifying a stabilizing braking demand within the framework of "redundant" stability control.

Preferably, it may be provided that:

a towing vehicle braking strategy is selected as the braking strategy if the monitoring result indicates that no trailer is coupled, or a first combination vehicle braking strategy or a second combination vehicle braking strategy is selected as the braking strategy if the monitoring result indicates that at least one trailer is coupled.

Thus, with regard to the driving behavior or driving dynamics of the vehicle, the two problematic cases are generally covered, that is, that the entire vehicle consists only of a towing vehicle or that the vehicle consists of a towing vehicle and at least one trailer coupled to the towing vehicle. In this way, it can thus be advantageously achieved to select a braking strategy adapted to the vehicle in the event of a braking demand, so that safe and efficient braking of the vehicle is possible. In particular, in the event that the vehicle consists of only a towing vehicle, which can be reliably detected via the sensor signals, the targeted selection of the towing vehicle braking strategy can enable rapid braking or a short braking distance, since the trailer handling or the driving dynamics of the trailer or the presence of a trailer generally do not have to be taken into account.

Preferably, therefore, it can thus be provided that:

in the case of selection of the first vehicle combination braking strategy, preferably in the towing vehicle brake system, a towing vehicle control signal for braking the towing vehicle and/or a trailer control signal for braking the at least one trailer is/are generated depending on there being a braking demand, assuming that at least one trailer is coupled, which follows from the sensor signals, and that the at least one coupled trailer has no trailer stability control or does not have functioning trailer stability control, which follows, for example, from the fact that the trailer could not be detected in any other way, in the case of selection of the second vehicle combination braking strategy, a towing vehicle control signal for braking the towing vehicle and/or a trailer control signal for braking the at least one trailer is/are generated depending on there being a braking demand assuming that at least one trailer is coupled and that the at least one coupled trailer has functioning trailer stability control, or in the case of the selection of the towing vehicle braking strategy, a towing vehicle control signal for braking the towing vehicle is generated depending on there being a braking demand, assuming that no trailer is coupled, which follows from the sensor signals, and only the towing vehicle is to be braked, wherein the towing vehicle control signal is used to actuate a towing vehicle brake system in the towing vehicle and the trailer control signal is used to actuate a trailer brake system in the respective coupled trailer and the towing vehicle brake system and the trailer brake system form the vehicle brake system.

As a result, for example, for the towing vehicle without a coupled trailer or with a coupled trailer and functioning trailer stability control, in particular trailer ABS control and/or trailer RSC control, the brakes can be actuated with higher brake pressures (towing vehicle braking strategy) than for the towing vehicle with a coupled trailer and without functioning trailer stability control. This enables a significantly shorter braking distance for the towing vehicle without a coupled trailer and better controllability for a towing vehicle with a coupled trailer. According to an extended first combination vehicle braking strategy, it can also be assumed that the trailer cannot be actuated at all, that is, not even via the trailer control signal, that is, it remains unbraked. Accordingly, the braking of the combination vehicle is only to be provided by the towing vehicle. Different braking strategies in terms of braking time are also possible. Furthermore, different braking strategies are possible with regard to (braking) energy recovery during braking, such as preferred electric braking with an electrically powered towing vehicle, for example.

Preferably, it can also be provided that the towing vehicle control signal for braking the towing vehicle and/or the trailer control signal for braking the at least one trailer is/are generated in the case of the selection of the first combination vehicle braking strategy depending on a number of detected trailers and/or depending on a trailer type of a detected trailer. Therefore, an additional distinction can be made within the first combination vehicle braking strategy or effectively a sub-braking strategy can be used for even more targeted braking of the towing vehicle. The number of detected trailers and/or the type of the trailer can preferably be determined depending on the sensor signal from at least one of the vehicle sensors.

This additional information about the trailer type and/or a number of coupled trailers and, if applicable, other attributes that follow from the trailer type, such as: a number of axles of the respective trailer, a trailer configuration (semi-trailer, drawbar trailer, et cetera) of the respective trailer, a trailer brake system type of the respective trailer, a trailer loading condition and/or a trailer center of gravity of the respective trailer, can be included within the first combination vehicle braking strategy, that is, a targeted actuation of the brakes of the towing vehicle via the towing vehicle control signal or braking of the trailer via the trailer control signal in which this information is taken into account. For example, for a road train consisting of a towing vehicle and several long coupled trailers detected by the sensor signals, different braking within the combination vehicle braking strategy is preferred in terms of stability than for a towing vehicle with only one small coupled trailer detected by the sensor signals.

Also, the specific physical driving properties of the respective trailer type or trailer configuration, for example of semi-trailers and drawbar trailers, can be used after its reliable detection, for example via vehicle sensors, to generate the towing vehicle control signal or the trailer control signal and thus to implement an optimal sub-braking strategy of the first combination vehicle braking strategy in the respective driving situation and thus to keep the combination vehicle stable despite the lack of trailer stability control. Furthermore, for example, the information about the number of axles of the trailer in question can also be a valuable indication, which is further processed in the towing vehicle brake system in order to generate the towing vehicle control signal or the trailer control signal and thus enable optimized braking.

The information about the number of coupled trailers can also be used in particular to check whether the number of the trailers with error-free or functioning trailer stability control (for example detected via the interface signals) matches the number of coupled trailers detected by the vehicle sensors. In this way, the vehicle sensors can be used to ensure that all trailers have functioning trailer stability control or not and that the respective braking strategy can be selected depending on this.

Preferably, it can provided be that the towing vehicle control signal for braking the towing vehicle and/or the trailer control signal for braking the at least one trailer is/are generated in the event of the selection of the towing vehicle braking strategy or the first combination vehicle braking strategy or the second combination vehicle braking strategy in the towing vehicle brake system of the towing vehicle in order to implement a braking demand, wherein the trailer control signal is transmitted via the trailer interface to the trailer brake system in the trailer.

This takes into account the fact that the method is mainly used when detection of the trailer via the interface signals cannot provide reliable information and/or the trailer brake system is not fully functional because, for example, the electrical actuation does not function properly. Therefore, when there is a braking demand, reliable actuation of the trailer brake system can be carried out via the towing vehicle brake system alone, which can be reliably actuated in this case, preferably via the pneumatically specified trailer control signal, in order to achieve controllable and monitorable braking of the entire vehicle.

The method can also be used to create redundancy for trailer detection, which combines evaluation of the interface signal on the one hand with evaluation of the sensor signal on the other. If, for example, the (radio) connection/plug connection required for communication via the trailer interface is not activated/plugged in or is defective, so that no trailer can be detected on the towing vehicle via the trailer interface, an additional determination or plausibility check can be carried out via the evaluation according to the disclosure of the sensor signal. The conventional method is thus extended by the method according to the disclosure of trailer detection which is independent of the interface signal. This makes it possible to counter the problem described at the beginning whereby it cannot be determined with sufficient certainty whether or not the driving behavior or driving dynamics of a trailer must be taken into account when braking.

In the case of a further embodiment, the monitoring result of the control unit, which is independent of the interface signal, is compared with a detection result from an additional trailer detection unit for this purpose, wherein the detection result is preferably dependent on the interface signals acting on the trailer interface and/or transmitted via the trailer interface in the case of a coupled trailer, wherein a first comparison result is provided as a comparison result if both the monitoring result and the detection result indicate that a trailer is coupled, or wherein a fifth comparison result is provided as a comparison result if the monitoring result indicates that a trailer is coupled and the detection result indicates a coupled trailer with a defect, wherein a fourth comparison result is provided as a comparison result if both the monitoring result and the detection result indicate that no trailer is coupled,

wherein a third comparison result is provided as a comparison result if the monitoring result indicates a coupled trailer and the detection result of the trailer detection device does not indicate a coupled trailer, and wherein a second comparison result is provided as a comparison result if the monitoring result does not indicate a coupled trailer and the detection result of the trailer detection device indicates a coupled trailer with or without the presence of a defect, wherein the braking strategy is then additionally selected depending on the comparison result.

By comparing the monitoring result determined via the sensor signal with a detection result determined in other ways, which is preferably based on an alternative data basis, since the monitoring result is determined in a monitoring unit independently of the detection result of the trailer detection device, therefore an additional check or plausibility check of the results can be carried out. Thus, additional certainty is achieved with regard to whether the respective result is actually correct or not. The comparison thus makes it possible to say with greater certainty whether or not a trailer is coupled to the towing vehicle and therefore to select the braking strategy more reliably.

Any deviations in the results can also provide information about the condition of the vehicle: in the case of the third comparison result, the sensor signal was used to detect a trailer coupled to the towing vehicle, while the trailer detection unit did not detect a coupled trailer based on the interface signals. From this it could be concluded, for example, that the trailer detection unit is defective or that there is an arbitrary fault. In the case of a trailer detection unit based on an electrical and/or pneumatic and/or hydraulic connection between the trailer and the towing vehicle, only the connection might be defective, for example the connector plug could not be plugged in or not plugged in correctly.

In the case of the second comparison result, no trailer coupled to the towing vehicle was detected via the sensor signal, while a coupled trailer was detected via the trailer detection unit. Therefore, the trailer detection unit could be defective or the evaluation of the sensor signals in the monitoring unit could be inaccurate or a combination of both.

For example, the driver or a person monitoring the vehicle can be informed about this vehicle condition or the comparison result via a user interface, such as a display. This makes it possible, for example, for the human driver or a person monitoring the vehicle to draw conclusions about the condition of the vehicle. For example, it can be assumed that with the first or fourth comparison results, the corresponding vehicle sensors and devices are working properly and that the connections between the towing vehicle and the coupled trailer are also correctly connected. For example, in the case of the second or third comparison result, it can be assumed that one of the above faults or defects exists, whereupon this can be checked. Therefore, additional information about the condition of the vehicle can be provided.

In a further embodiment, it is provided that:

in the case of the first comparison result, the second combination vehicle braking strategy is selected to implement the braking demand, in the case of the fourth comparison result, the towing vehicle braking strategy is selected to implement the braking demand, and in the case of the second, third or fifth comparison result, the first combination braking strategy is selected to implement the braking demand.

An appropriate selection of the braking strategies offers safe and efficient braking of the vehicle and thus a high level of safety for the vehicle itself as well as road users. In the case of the first comparison result, it was determined on the basis of at least two independent data bases that a trailer is coupled to the towing vehicle, in particular with functioning trailer stability control. As a result, the second combination vehicle braking strategy with actuation of the towing vehicle brake system and/or the trailer brake system is selected and implemented in the event of a braking demand in order to exploit the full braking potential for this driving condition. If, in addition, in the case of the fifth comparison result at least the presence of a trailer with defective electronic actuation of the trailer is detected, in particular faulty trailer stability control, at least the first combination vehicle braking strategy is applied in order to brake the combination vehicle when the trailer is present in a correspondingly reliable and stable manner.

On the other hand, in the case of the fourth comparison result, it can be assumed with a high degree of certainty that no trailer is actually coupled to the towing vehicle on the basis of at least two independent data bases, so that the towing vehicle braking strategy is selected, which results, for example, in a shortened braking distance for the towing vehicle compared to the first combination vehicle braking strategy.

In the case of the second or third comparison result, as explained above, it is not clear why the comparison result is different. For safety reasons, it is assumed that a trailer is coupled to the towing vehicle and the first combination vehicle braking strategy is selected accordingly.

BRIEF DESCRIPTION OF DRAWINGS

The invention will now be described with reference to the drawings wherein.

DETAILED DESCRIPTION

Figure 1:
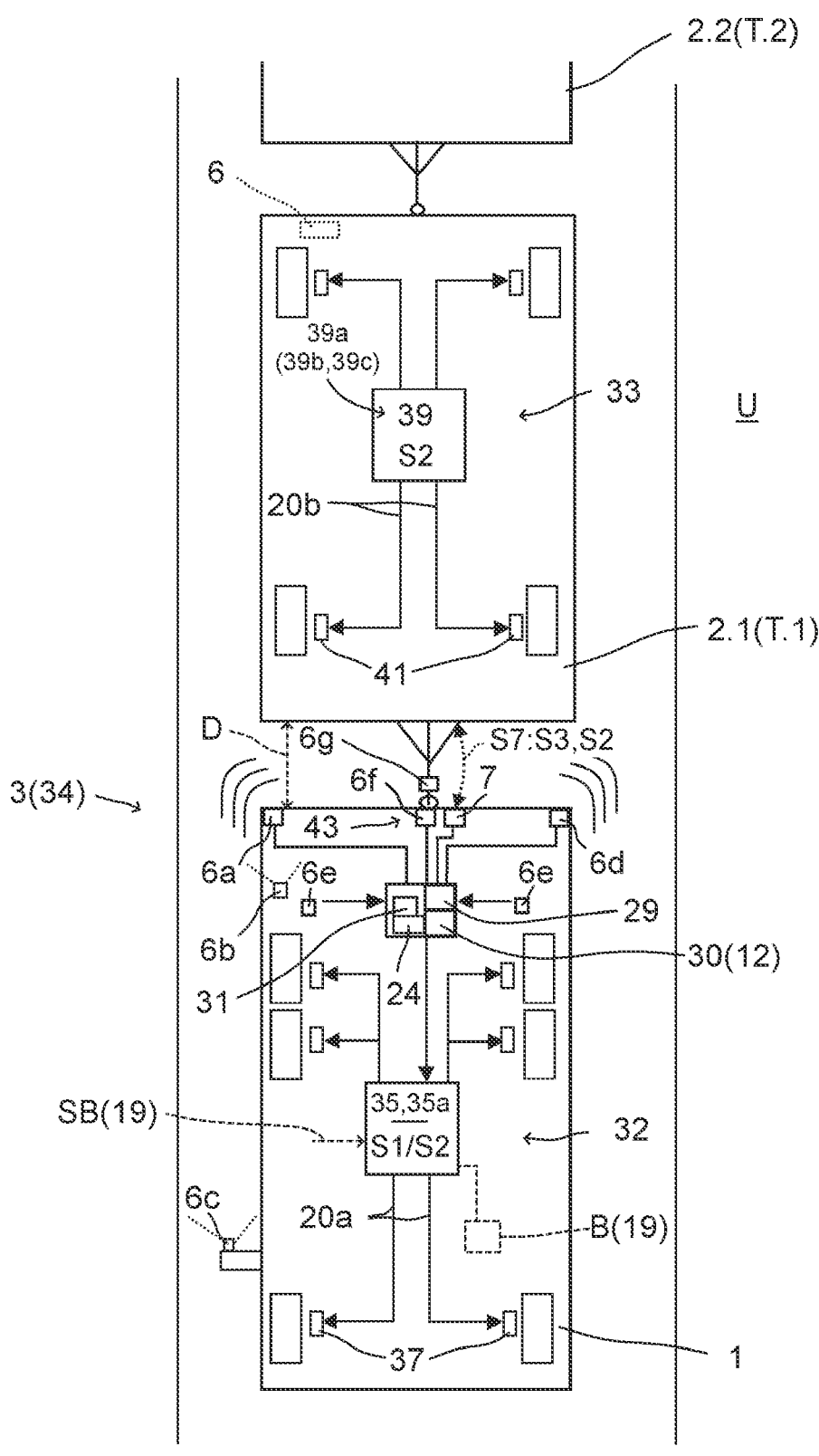
FIG. 1 shows a schematic plan view of a vehicle set up to carry out the method according to the disclosure.

FIG. 1 shows a schematic plan view of a vehicle 3 or vehicle combination, which is set up to carry out the method according to the disclosure. The vehicle 3 consists of a towing vehicle 1 and trailers 2.n coupled to it (with n=1, 2, . . . N) of a certain type of trailer T.i (with i=1, 2, . . . M), that is, a coupled first trailer 2.1 of a first trailer type T.1 and a coupled second trailer 2.2 of a second trailer type T.2, the second trailer 2.2 being only hinted at and not described further.

The trailer type T.i characterizes the type of the respective trailer 2.n, wherein for example information about the respective trailer 2.n regarding a number of axles AN, a trailer design AK (for example semi-trailer AK1, drawbar trailer AK2, . . . ), a trailer-brake system type AB (for example with a trailer ABS controller 39a), a trailer load condition AZ (full, half full, empty) and/or a position of a trailer center of gravity AS (high, low) can be included in the trailer type T.i. With the help of these attributes and, if appropriate, further information about the respective trailer 2.n, the braking of the entire vehicle combination can be optimized below when a certain trailer type T.i is detected, especially with regard to driving stability, as explained in more detail below.

The vehicle 3 consisting of the towing vehicle 1 and one or more trailers 2.*n* of a particular trailer type T.i has a vehicle brake system 34 which is divided into a towing vehicle brake system 32 arranged in the towing vehicle 1 and a trailer brake system 33 arranged in the corresponding trailer 2.*n*, which are coordinated with each other or can also be actuated individually in order to brake the entire vehicle 3 according to a braking demand 19 specified manually via a control element B or automatically via a braking demand signal SB.

The towing vehicle brake system 32 has a towing vehicle control device 35 with a towing vehicle stability control system 35*a* and corresponding towing vehicle control lines 20*a* for actuating individual towing vehicle brakes 37 via a towing vehicle control signal S1, wherein the towing vehicle control signal S1 can be generated axle-individually or wheel-individually, depending on the configuration of the towing vehicle brake system 32. The towing vehicle stability control 35*a* ensures that the towing vehicle 1 in particular remains stable when the towing vehicle brakes 37 are actuated axle-individually or wheel-individually, wherein the towing vehicle stability control 35*a* includes the usual stability functions (RSC, ABS, ASR, ESC, . . . ).

The towing vehicle control lines 20*a*, which are shown in FIG. 1 only schematically, may have pressure lines and/or electrical lines, so that the towing vehicle control signal S1 can be a hydraulic or a pneumatic or an electrical control signal, which can also be converted between the individual "media" via suitable control valves. As a result, purely hydraulic or purely pneumatic or purely electrical actuation of the towing vehicle brakes 37 or a combination thereof (electro-pneumatic, electro-hydraulic, hydraulic-pneumatic) may be made possible, wherein additional control valves which are not shown are to be provided in the towing vehicle control lines 20*a* for combined actuation.

The trailer brake system 33 in the first trailer 2.1 has a trailer control device 39 with trailer stability control 39*a*, in particular trailer ABS control 39*b* and/or trailer RSC control 39*c*, and corresponding trailer control lines 20*b* for the actuation of individual trailer brakes 41 in the first trailer 2.1 via a trailer control signal S2, wherein the trailer control signal S2 can be generated axle-specifically or wheel-specifically depending on the configuration of the trailer brake system 33. In addition, the trailer ABS control 39*b* ensures that the wheels of the trailer 2.*n* in question do not lock when actuated with the trailer control signal S2 in order to keep the respective trailer 2.*n* stable. In addition, the trailer RSC control 39*c* can prevent the respective trailer 2.*n* from tipping over by appropriate braking interventions on the trailer 2.*n*.

As in the towing vehicle 1, purely hydraulic or purely pneumatic or purely electric actuation of the trailer brakes 41 or a combination thereof (electro-pneumatic, electro-hydraulic, hydraulic-pneumatic) can be made possible. The configuration of the second trailer 2.2 or further trailers 2.*n* can also be carried out accordingly.

The trailer interface 7 is arranged in the rear area of the towing vehicle 1 and is used for the transmission of interface signals S7, that is, any signals that are to be transmitted between the towing vehicle 1 and the first trailer 2.1 and, if appropriate, other trailers 2.*n* and which are "fed" to the trailer interface 7 for this purpose. This can be done in a standardized way. In the present case, the signals transmitted as interface signals S7 can form the data basis for a trailer detection unit 24 according to one version, as explained in more detail later.

The trailer interface 7 is configured to transmit a pneumatic and/or hydraulic and/or electrical signal generated in the towing vehicle 1 or in the respective trailer 2.*n* and fed to the trailer interface 7 as an interface signal S7 between the towing vehicle 1 and the trailer 2.*n* in question. For example, a pneumatic trailer control signal S2 generated by the towing vehicle brake system 32, which is formed during normal operation, for example depending on the towing vehicle control signal S1 intended for the front axle of the towing vehicle 1, can be transmitted as a pneumatic interface signal S7 via the trailer interface 7 to the trailer 2.*n* in question in order to ensure that the trailer 2.*n* in question is braked accordingly. In this case, the braking of the trailer 2.*n* is therefore specified by the towing vehicle 1, for example by the towing vehicle brake system 32. If trailer stability control 39*a* is available, the trailer control signal S2 is generated during normal operation under the condition that the trailer stability control 39*a* can compensate for any instabilities that may occur (ABS, RSC). Accordingly, higher control pressures can be applied.

In principle, in the case of such purely pneumatic actuation of the trailer brakes 41 of a trailer 2.*n*, the trailer control device 39 with trailer stability control 39*a* can also be omitted if the specified (pneumatic) trailer control signal S2 for controlling the trailer brakes 41 is transmitted to the trailer brake system 33 via the trailer interface 7 (via an interface signal S7). However, without such a trailer control device 39, the trailer stability control 39*a* implemented therein cannot compensate for any instabilities that may occur. This must be taken into account when generating the pneumatic trailer control signal S2, wherein sometimes lower control pressures are transmitted to the trailer 2.*n* in order to prevent locking of the wheels or the trailer 2.*n* from tipping over.

However, any electrical signals can also be transmitted as interface signals S7 from the towing vehicle 1 to the trailer 2.*n* in question or vice versa from the respective trailer 2.*n* to the towing vehicle 1 via the trailer interface 7 in order to enable coordinated and safe driving operation. Such a trailer interface 7 may also be provided between the first trailer 2.1 and the second trailer 2.2 or between each additional trailer 2.*n*. In particular, the trailer interface 7 can also be used to supply the trailer control device 39 with energy, in particular to enable trailer stability control 39*a*.

The towing vehicle 1 also has one or more vehicle sensors 6, the generated and output sensor signals S6 of which allow conclusions to be drawn as to whether or not one or more trailers 2.*n* is or are coupled to the towing vehicle 1. The sensor signals S6 can be transmitted, for example, via the vehicle's internal bus system (for example a CAN bus). For example, radar sensors 6*a* and/or cameras 6*b* and/or lidar sensors 6*c* and/or ultrasonic sensors 6*d*, which are based on an optical measuring principle, can be considered as vehicle sensors 6. Via these optically acting vehicle sensors 6; 6*a*, 6*b*, 6*c*, 6*d*, an environment U around the vehicle 3 can be monitored or observed, wherein detection regions of the aforementioned vehicle sensors 6; 6*a*, 6*b*, 6*c*, 6*d* are to be oriented accordingly in order to allow a conclusion to be drawn about a coupled trailer 2.*n*.

In the arrangement shown in FIG. 1, for example, the coupled first trailer 2.1 can be detected from temporal monitoring of the sensor signal S6 which is generated and output by the radar sensor 6*a* as a vehicle sensor 6. In particular, it can be taken into account that the sensor signal S6 of the radar sensor 6a indicates that there is a constant distance D between the first trailer 2.1 and the towing vehicle 1 both when braking and when accelerating the towing vehicle 1. A monitoring unit 30 in the towing vehicle 1 that evaluates the sensor signal S6, which can be configured, for example, as software or as a hardware unit, can therefore output as a monitoring result 12 that a coupled trailer 2 is present based on the sensor signals S6 of the radar sensor 6a. This applies correspondingly to the use of the other optical vehicle sensors mentioned 6; 6a, 6b, 6c, 6d.

Furthermore, an axle load sensor 6e and/or a coupling sensor 6f of an automated towing hitch 43 and/or an articulation angle sensor 6g can be used as mechanically acting sensors as vehicle sensors 6 in order to draw conclusions about a coupled trailer 2.n. For this purpose, the axle load sensor 6e measures the forces acting on the axles of the towing vehicle 1, which change under mechanical influence when the first trailer 2.1 is coupled. The coupling sensor 6f may be a touch sensor in the coupling jaw of an automated towing hitch 43, which outputs a corresponding sensor signal S6 under mechanical action in the case of a coupled trailer 2.n. The articulation angle sensor 6g outputs a corresponding articulation angle between the towing vehicle 1 and the trailer 2.n or between two trailers 2.n, which depends on whether there is a trailer 2.n present at all or not. Therefore, based on the sensor signals S6 of these mechanically acting vehicle sensors 6; 6e, 6f, 6g, the monitoring unit 30 may output as a monitoring result 12 whether a trailer 2.n is coupled to the towing vehicle 1 or not.

All of these vehicle sensors 6 (optical and/or mechanical) may be provided in combination with each other or individually. Alternatively or additionally, vehicle sensors 6 arranged on one of the trailers 2.n may be used to determine whether another trailer or a subsequent trailer 2.n is present. Preferably, vehicle sensors 6 do not have to be installed additionally. Rather, vehicle sensors 6 are used which are already present in the vehicle 1 anyway. This makes it easy to retrofit.

Other vehicle sensors 6, which demonstrably generate and output different sensor signals S6 with a trailer 2.n coupled than without a trailer 2.n coupled, can also be considered for such an evaluation in the monitoring unit 30. The disclosure is limited only to the fact that the monitoring unit 30 generates the monitoring result 12, which is based on the measurements of the respective vehicle sensors 6, independently of a signal that the trailer interface 7 feeds to the trailer 2.n in question and, in the case of an actually coupled trailer 2.n, is also transmitted as an interface signal S7 via the trailer interface 7 to the trailer 2.n in question.

The trailer in question 2.n is the trailer 2.n, the presence of which is to be checked by the method according to the disclosure. Therefore, the monitoring result 12 can be based, for example, on sensor signals S6 which are generated and output by a vehicle sensor 6 on the first trailer 2.1 and are transmitted via the trailer interface 7 from the first trailer 2.1 to the towing vehicle 1 if the first trailer 2.1 is not the trailer 2.n in question, the presence of which is to be checked depending on the transmitted sensor signals S6. Nevertheless, based on these sensor signals S6 transmitted via the trailer interface 7 from the first trailer 2.1 to the towing vehicle 1, a monitoring result 12 can be determined according to the method according to the disclosure, which indicates whether a second trailer 2.2 is present. In this case, the monitoring result 12 is generated independently of a signal that is fed by the trailer interface 7 to the relevant second trailer 2.2 and that is or could be also transmitted via this if appropriate.

Thus, for example, a pressure sensor which measures the pressure of the pneumatic trailer control signal S2 generated in the towing vehicle 1, which is transmitted at the trailer interface 7 to the first trailer 2.1 in question and, in the case of a coupled first trailer 2.1, is also transmitted to the first trailer 2.1 via the interface signal S7, is not a vehicle sensor 6 which the monitoring unit 30 of the disclosure accesses to determine the monitoring result 12. Although a measurement of this pressure can be used to determine whether or not a trailer is coupled, the monitoring unit 30 does not use such a pressure sensor signal as a sensor signal S6 to determine whether or not a trailer 2.n is coupled, since such pneumatic monitoring is dependent on the interface signal S7 transmitted at or via the trailer interface 7 to the first trailer 2.1 in question. Based on this, a plausibility check can take place if necessary. Similarly, this applies to hydraulic or electrical signals which can be transmitted as interface signals S7 to or via the trailer interface 7 to the trailer 2.n in question.

The sensor signals S6 of the respective vehicle sensors 6 are received by a receiver unit 29 and transmitted to the monitoring unit 30 for evaluation, wherein the receiver unit 29 may be part of the monitoring unit 30. After the evaluation of the respective sensor signal S6, the monitoring result 12 is provided at an output unit 31. The monitoring result 12 may preferably contain direct information as to whether one (or more) trailers 2.n is (are) coupled to the towing vehicle 1 or not ("Yes"/"No").

Figure 2:
FIG. 2 shows a flowchart of an embodiment of the method.

FIG. 2 shows a flowchart of an embodiment of the method according to the disclosure. The sensor signal S6, which is provided by one or more vehicle sensors 6 as described above, is transmitted to the receiver unit 29 or read by the receiver unit 29 in a first monitoring step SK1. Subsequently, in a second monitoring step SK2, the sensor signal S6 is evaluated in the monitoring unit 30. The evaluation can be carried out, for example, as described above, by using the sensor signals S6 of the vehicle sensors 6; 6a, 6b, 6c, 6d, which optically capture an environment U, the distance D to a detected object is continuously determined and a plausibility check is thus carried out as to whether or not it can be a trailer 2.n. Accordingly, an evaluation is carried out by monitoring the axle loads of the towing vehicle 1 measured by the axle load sensor 6e or the detection of a coupled trailer 2.n is carried out via the coupling sensor 6f in the coupling jaw of the automated towing hitch 43.

The monitoring result 12 determined in the second monitoring step SK2 then indicates directly or indirectly, depending on the respective sensor signal S6, whether a trailer 2.n is coupled to the towing vehicle 1 or whether no trailer 2.n is coupled to the towing vehicle 1. Depending on this monitoring result 12, a braking strategy 18 is again selected in a third monitoring step SK3 which is a direct consequence of the monitoring result 12 according to the flow chart shown in FIG. 2. Similarly, the monitoring result 12 may already contain a braking strategy 18, which is selected based on whether a trailer 2.n of a certain trailer type T.i has been detected. The monitoring result 12 is therefore also dependent in this case on the presence or the detection of one or more trailers 2.n, possibly of a certain trailer type T.i.

When carrying out these monitoring steps SK1, SK2, SK3, it is assumed that it was not possible to determine whether or not a trailer 2.n is coupled to the towing vehicle 1 in another way with certainty beforehand. This is the case, for example, if the trailer control device 39 with the trailer stability control 39a has not provided corresponding feedback on its functionality, for example via a status signal S3 to the towing vehicle brake system 32, for example because the trailer control device 39 has a defect or is not supplied with power or there is no electrical connection or there is no trailer control device 39 in the respective trailer 2.*n*. The monitoring steps SK1, SK2, SK3 are thus used to check whether a coupled trailer 2.*n* is present or not on the basis of the sensor signals S6.

If, depending on the respective sensor signal S6, the monitoring result 12 indicates that a coupled trailer 2.*n* is present (12: y), this directly results, for example, in the selection of a first combination vehicle braking strategy 18*ga* as the braking strategy 18. With this selected first combination vehicle braking strategy 18*ga*, depending on there being a braking demand 19 in the towing vehicle brake system 32, a towing vehicle control signal S1 for braking the towing vehicle 1 as well as a pneumatic trailer control signal S2 for braking the trailer(s) 2.*n* are generated, each of which takes into account that a trailer 2.*n* is present (determined from the sensor signal S6), but that it has no trailer stability control 39*a* or has no functional trailer stability control 39*a* (determined from lack of feedback from the trailer 2.*n* or lack of a status signal S3). The towing vehicle 1 and the trailer(s) 2.*n* are therefore braked on the assumption that at least one trailer 2.*n* is coupled, but that any instability that may occur cannot be corrected by the trailer stability control system 39*a*.

This may mean, for example, that in the first combination vehicle braking strategy 18*ga*, if there is a manually or automatically specified braking demand 19, the (pneumatic) trailer control signal S2 is generated in the towing vehicle brake system 32 in such a way that lower or correspondingly limited control pressures are transmitted to the trailer 2.*n* via the interface signal S7. As a result, excessive braking interventions, which may lead to locking of the wheels on the trailer 2.*n* and which are otherwise corrected by trailer ABS control 39*b*, can be avoided from the outset. In addition, the towing vehicle control signal S1 can also be generated in the first combination vehicle braking strategy 18*ga* in such a way that a larger part of the braking demand 19 is undertaken by the towing vehicle 1 in order to be able to reduce the braking intervention on the trailer 2.*n*.

Furthermore, in the event of sensor determination that a stability-critical situation occurs on one of the trailers 2.*n* (outside the unavailable trailer RSC control 39*c*), for example there is a risk of tipping over when cornering, a corresponding towing vehicle control signal S1 or trailer control signal S2 with which this instability is prevented can be generated by the towing vehicle brake system 32 after selection of the first combination vehicle braking strategy 18*ga*. In the first combination vehicle braking strategy 18*ga*, a stabilizing braking demand 19*s* can therefore be generated from a "redundant" stability function in the towing vehicle 1 (based on sensor estimates), depending on which the braking demand 19 is specified and which results in a corresponding towing vehicle control signal S1 or trailer control signal S2 in order to ensure stability of the trailer 2.*n* and/or also the towing vehicle 1, and which assumes that no trailer stability control 39*a* is available in the trailer 2.*n*. The stabilizing braking demand 19*s* can be determined, for example, depending on the sensor signals S6 of the vehicle sensors 6, which can be used to detect or predict or suspect an unstable situation.

In accordance with an extended version, when selecting the first combination vehicle braking strategy 18*ga* it can also be assumed that the trailer brake system 33 itself is not or cannot be actuated, that is, no trailer control signal S2 is generated because, for example, the pneumatic communication with the respective trailer 2.*n* is also faulty. Accordingly, the towing vehicle 1 alone must ensure stable braking. However, this is rather a special case, since at least the pneumatic path via the trailer interface 7 is normally available.

Preferably, it is also provided that the towing vehicle control signal S1 and the trailer control signal S2 are generated in the first trailer strategy depending on further information, for example depending on a number N of detected trailers 2.*n* and/or a detected trailer type T.i of the coupled trailer(s) 2.*n*. This additional information can also be determined based on the sensor signals S6 of the respective vehicle sensors 6. For example, a camera 6*b* can be used to draw conclusions about the number N of trailers 2.*n* but also about the trailer type T.i, for example the trailer loading condition AZ (empty, half-full, full), the position of a trailer center of gravity AS, the number of axles AN, the trailer structure AK (for example semi-trailer AK1, drawbar trailer AK2, . . . ), et cetera. The other optical vehicle sensors 6 can also be used to estimate the structural properties of a trailer 2.*n*.

Thus, in the case of a detected trailer 2.*n*, which can be, for example, a semi-trailer AK1 or a drawbar trailer AK2, which also has a detected number of axles AN of, for example, "two" as well as a high trailer center of gravity AS with a full trailer loading condition AZ, coordinated actuation of the towing vehicle brake system 32 is carried out via a correspondingly generated towing vehicle control signal S1 and of the trailer brake system 2.*n* via a pneumatic trailer control signal S2 generated in the towing vehicle brake system 32, which differs from the actuation of a detected unladen trailer 2.*n* with a low trailer center of gravity AS and a number of axles AN of "three".

Thus, in the first combination vehicle braking strategy 18*ga*, braking can be specified for the entire combination vehicle on the basis of the sensor-detected trailer type T.i and the associated attributes based on the towing vehicle brake system 32, taking into account non-present or non-functional trailer stability control 39*a*, which can nevertheless ensure stable driving.

However, in a second combination vehicle braking strategy 18*gb*, which will be explained later, a towing vehicle control signal S1 and a trailer control signal S2 can also be generated in the towing vehicle brake system 32, provided that the trailer stability control 39*a* is fully functional. In this variant, when generating the control signals S1, S2 it can be assumed that the stability controls 35*a*, 39*a* are fully functional, so that the full braking potential can be exploited. However, once it has been detected that no trailer stability control 39*a* is available in one of the existing trailers 2.*n* due to the absence of a status signal S3 from the trailer 2.*n* concerned and the monitoring via the sensor signal S6, the braking strategy is or the control signals S1, S2 are adapted accordingly to this circumstance (selection of the first combination vehicle braking strategy 18*ga*). In this way, both the full braking potential can be exploited and safe driving can be guaranteed.

If, depending on the respective sensor signal S6, the monitoring result 12 indicates that there is no coupled trailer 2.*n* (12: n), this directly results in the selection of a towing vehicle braking strategy 18*z*. With this selected towing vehicle braking strategy 18*z*, the towing vehicle control signal S1 for braking the towing vehicle 1 is generated regardless of a determined trailer driving behavior or possible driving dynamics FD of a trailer 2.*n*, since it is assumed from this that no such trailer 2.*n* is present. Therefore, the full braking potential can be exploited on the towing vehicle 1 since no consideration is to be given to possible instability of the (non-present) trailer 2.*n* (provided that the towing vehicle stability control 35*a* is functional). This is comparable to the second combination vehicle braking strategy 18*gb* (see below), for which it is assumed that the coupled trailer(s) 2.*n* is/are each operated with functional trailer stability control 39*a*.

Following the selection of the braking strategy 18, in a fourth monitoring step SK4 in the case of an existing braking demand 19, the corresponding implementation of the selected braking strategy 18 is carried out by actuating the towing vehicle brake system 32 with the towing vehicle control signal S1 generated depending on the selected braking strategy 18 and the trailer brake system 33 with the (pneumatic) trailer control signal S2 generated depending on the selected braking strategy 18. The braking demand 19 can, for example, be specified manually by the driver via the control element B, for example the brake pedal, or automatically by the braking demand signal SB, as generated by a system in the vehicle (XBR; ACC; RSC, et cetera) or, for example depending on the stabilizing braking demand 19*s*, generated by "redundant" stability control in the first combination vehicle braking strategy 18*ga*.

Figure 3:
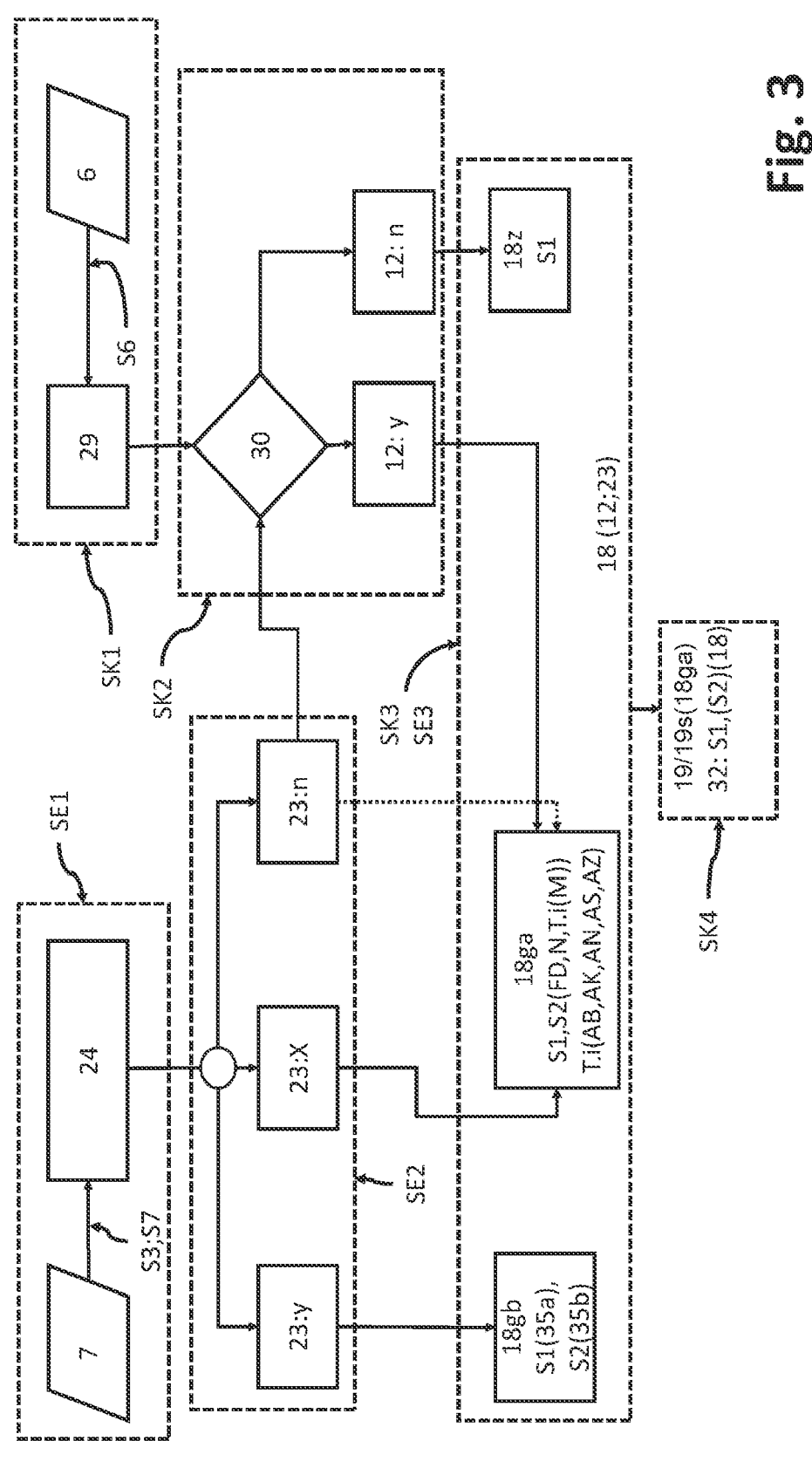
FIG. 3 shows another flowchart of an embodiment of the method.

FIG. 3 shows another flowchart of an embodiment of the method according to the disclosure, which is based on a method of the prior art and extends it accordingly. In the embodiment described, a trailer detection unit 24, which is in the form of software or a hardware unit, is used in a second detection step SE2 on the basis of electrical and/or pneumatic and/or hydraulic interface signals S7 transmitted in a first detection step SE1 via the trailer interface 7 to detect whether or not a trailer 2.*n* is coupled to the towing vehicle 1. The interface signals S7 can also be used, for example, to determine the number N of trailers 2.*n* that are or should be present.

For example, in the case of a procedure according to FIG. 3, it can be assumed that the trailer(s) 2.*n* that is/are or can be coupled has/have an electronically operated trailer brake system 33, preferably with trailer stability control 39*a*, in particular trailer ABS control 39*b*. In this case, electronic data exchange between the towing vehicle brake system 32 and the trailer brake system 33 of one or more (number N) trailers 2.*n* can take place via an ISO11992 or a PLC interface.

For example, an electrical status signal S3 can then be transmitted via the trailer interface 7 by the trailer detection unit 24 as an interface signal S7. If a trailer 2.*n* with a functioning electronic trailer brake system 33, in particular a functioning trailer control device 39 including trailer stability control 39*a*, is coupled to the towing vehicle 1, the electrical status signal S3 can be transmitted between the towing vehicle 1 and the respective trailer 2.*n* without further interference, which can be determined by the trailer detection unit 24 in the second detection step SE2. In an analogous manner, the status signal S3 can also be a pneumatic or hydraulic signal that is modulated accordingly and the successful transmission of which to the trailer 2.*n* can also be determined in the second detection step SE2, for example via a pressure sensor in the flow path before or after the trailer interface 7.

If, in the second detection step SE2, depending on the respective status signal S3, it is detected that a trailer 2.*n* is coupled and that the trailer control device 39 including trailer stability control 39*a* is functional or present, this is output (23: y) in a detection result 23 and in a third detection step SE3 the second combination vehicle braking strategy 18*gb* is selected. The third detection step SE3, in which a braking strategy 18 is selected, coincides in the diagram shown in FIG. 3 with the third monitoring step SK3 according to the procedure in FIG. 2, which also applies here as explained later. The detection result 23 indicates whether or not a trailer 2.*n* was detected by the trailer detection unit 24 using the interface signals S7, in particular the electrical status signal S3. In contrast to the monitoring result 12, the detection result 23 is thus generated depending on a signal that the trailer interface 7 feeds to the relevant trailer 2.*n* and that, in the case of a coupled trailer 2.*n*, is transmitted as an interface signal S7 via the trailer interface 7.

The selected second combination vehicle braking strategy 18*gb* is based on the assumption that both the towing vehicle 1 and the coupled trailer 2.*n* have a functioning brake system, in each of which stability control 35*a*, 39*a* is available and functional, so that coordinated braking of the towing vehicle 1 and the trailer 2.*n* can take place in such a way that any instabilities that occur can be corrected by the respective stability control 35*a*, 39*b*. The towing vehicle control signal S1 and the trailer control signal S2 can therefore be generated in the second combination vehicle braking strategy 18*gb* in such a way that the full braking potential can be exploited.

If, for example, in the second detection step SE2, based on a status signal S3 issued or returned by the trailer brake system 33, which is transmitted as an interface signal S7 via the trailer interface 7, it is detected that a trailer 2.*n* is coupled, but the electronic trailer brake system 33, for example the trailer stability control 39*a*, in particular the trailer ABS control 39*b*, has a defect X, this is output in the detection result 23 (23: X) and the first combination vehicle braking strategy 18*ga* described above is selected in the third detection step SE3. In this case, the towing vehicle 1 and the respective trailer 2.*n* are braked on the assumption that possible instabilities are already taken into account in advance when generating the towing vehicle control signal S1 and the trailer control signal S2, since the trailer stability control 39*a* can no longer undertake this task. Here, too, a number N of trailers 2.*n* and/or a detected trailer type T.i can be taken into account.

If the evaluation of the status signal S3, in particular an electrical status signal S3, in the second detection step SE2 shows that no trailer 2.*n* is present (23: n), this is output in the detection result 23, whereupon the towing vehicle braking strategy 18*z* described above could be selected in the third detection step SE3. The towing vehicle brake system 1 would therefore be actuated under the assumption that no trailer 2.*n* is present or that no consideration is to be given to a non-present or non-functional trailer control device 39 or trailer stability control 39*a*. With this described procedure, however, it is not possible to say with sufficient certainty whether the selection of the towing vehicle braking strategy 18*z* by the trailer detection unit 24 is reliable, since, for example, connection cables or hoses of an actually coupled trailer 2.*n* that have not been plugged in or have loosened again can provide a faulty detection result 23 by the trailer detection unit 24, since in this case too no status signal S3 is available and can be evaluated. Furthermore, a coupled trailer 2.*n* could be present without an electric trailer control device 39 or without trailer stability control 39*a*, wherein at least there is also no electrical status signal S3. The selection of a towing vehicle braking strategy 18*z* which does not take into account a trailer 2.*n* that is not fully functional or present could therefore lead to swerving or unstable driving behavior of the trailer 2.*n* or the entire combination vehicle.

In order to counter this uncertainty, in the prior art in the event that no trailer 2.*n* is detected the first combination vehicle braking strategy 18*ga* is usually selected, as indicated by the dashed line in FIG. 3. This means that a vehicle 3 consisting of a towing vehicle 1 and a trailer 2.*n* that is not detected with the trailer detection unit 24 is braked in the same way as a vehicle 3 which consists only of a towing vehicle 1 and could therefore actually be braked with the towing vehicle braking strategy 18*z*. As a result, however, braking potential is lost.

Therefore, according to the embodiment shown in FIG. 3, an extended trailer detection is carried out in parallel via the monitoring unit 30, which is based on the method shown in FIG. 2 and which uses the sensor signal S6 in order to check or monitor the detection result 23 of the trailer detection unit 24 and therefore to be able to utilize the full potential when braking and not to erroneously select the first combination vehicle braking strategy 18*ga* instead of the towing vehicle braking strategy 18*z*.

Thus, if the trailer detection unit 24 does not actively detect a coupled trailer 2.*n* on the basis of the respective status signal S3, then before selecting a braking strategy 18, the embodiment of the method according to the disclosure shown in FIG. 2 is first carried out in the third detection step SE3 or in the third monitoring step SK3. Only if the evaluation of the sensor signal S6 indicates that no trailer 2.*n* is actually coupled, the towing vehicle braking strategy 18*z* is selected in the third detection step SE3 or in the third monitoring step SK3 and otherwise the first combination vehicle braking strategy 18*ga* is selected, with which, depending on there being a braking demand 19 in the towing vehicle brake system 32, a towing vehicle control signal S1 for braking the towing vehicle 1 as well as a pneumatic trailer control signal S2 for braking the trailer(s) 2.*n* are generated, each of which takes into account that a trailer 2.*n* is present (determined from the sensor signal S6), but that it has no trailer stability control 39*a* or no functional trailer stability control 39*a* (for example determined from a lack of feedback from the trailer 2.*n* or a missing status signal S3). Finally, in a fourth detection step SE4 or fourth monitoring step SK4, the towing vehicle brake system 32 is actuated with the corresponding towing vehicle control signal S1 and the trailer brake system 33 is actuated with the corresponding (pneumatic) trailer control signal S2.

Such a configuration arises, for example, if a trailer 2.*n* is coupled to the towing vehicle 1, the trailer detection unit 24 relies on electrical and/or pneumatic and/or hydraulic interface signals S7 transmitted via the trailer interface 7, but the plug connection of the trailer interface 7 required for this is not plugged in. As a result, no coupled trailer 2.*n* is initially detected by the trailer detection unit 24, wherein due to a missing electrical plug connection (electrical status signal S3) it is also assumed that the trailer control device 39 with the trailer stability control 39*a* is not present. However, the trailer(s) 2.*n* can subsequently be detected via the evaluation based on the sensor signal S6, as shown in FIG. 2. In this configuration, it was checked, so to speak, that no trailer 2.*n* is actually coupled via two independent signals, the sensor signals S6 and the interface signals S7 transmitted via the trailer interface 7, so that the risk of incorrect selection of the braking strategy 18 is minimized or excluded.

Figure 4:
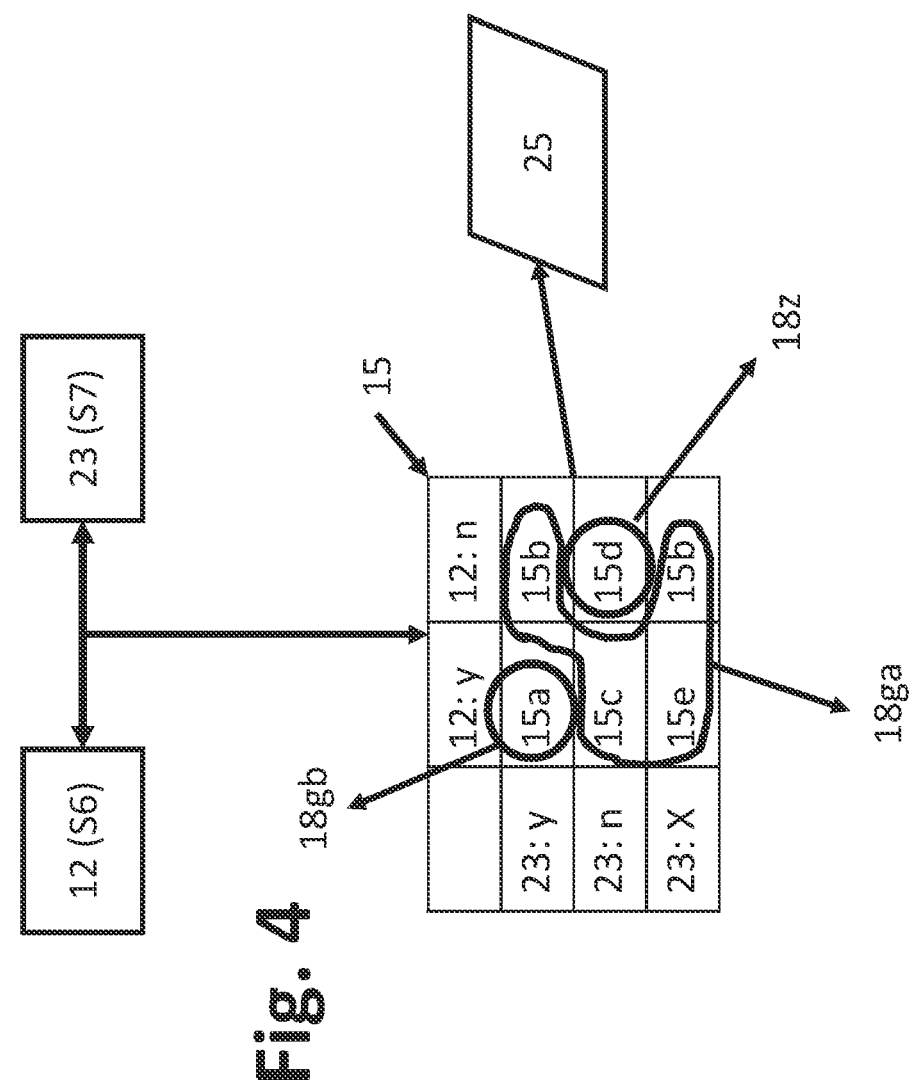
FIG. 4 shows an example of a results comparison routine.

FIG. 4 shows an example of a comparison routine. Here, the monitoring result 12 of the monitoring unit 30 based on the sensor signal S6 determined according to the disclosure is compared with the detection result 23 of the trailer detection unit 24 based on the interface signal S7 and a corresponding comparison result 15 is provided. In the present example, the monitoring result 12 can only consist of whether a coupled trailer 2.*n* was determined (y) or not (n)

on the basis of the sensor signal S6. The detection result 23 of the trailer detection unit 24 may consist of whether a coupled trailer 2.*n* was determined (y) or not (n) on the basis of the interface signal S7 or whether there is a defect (X). The possibilities of the comparison and the resulting braking strategies 18 are shown in matrix form in FIG. 4.

If both the detection result 23 of the trailer detection unit 24 and the monitoring result 12 of the monitoring unit 30 determine a coupled and functional and actuatable trailer 2.*n*, in particular with a trailer control unit 39 and trailer stability control 39 (*y, y*), this leads to a first comparison result 15*a* that indicates that both results 12, 23 are unanimously positive (y, y). A fourth comparison result 15*d* exists if both results 12, 23 indicate no trailer 2.*n* (n, n), that is, both are equally negative (n, n).

If the detection result 23 indicates a functional and actuatable trailer 2.*n* (y), but the monitoring result 12 does not indicate this (n), this leads to a second comparison result 15*b*, which indicates that the monitoring result 12 deviates negatively (deviating negatively (y, n)). If the detection result 23 indicates a defective trailer 2.*n* (X) and the monitoring result 12 indicates no trailer 2.*n* (n), this also leads to the second negatively deviating comparison result 15*b* (X, n).

If the detection result 23 does not indicate a trailer 2.*n* (n) and the monitoring result 12 indicates a trailer 2.*n* (y), there is a third comparison result 15*c*, which indicates that the monitoring result 12 deviates positively (n, y). If the detection result 23 indicates a defective trailer 2.*n* (X) and the monitoring result 12 indicates a trailer 2.*n* (y), this leads to a fifth comparison result 15*e*, which indicates that both results 12, 23 agree with regard to the presence of a trailer 2.*n*.

FIG. 4 also shows how the respective comparison result 15*a*, 15*b*, 15*c*, 15*d*, 15*e* influences the selection of the braking strategy 18. In the present case, only the fourth comparison result 15*d* leads to the selection of a towing vehicle braking strategy 18*z*. The towing vehicle braking strategy 18*z* is only selected if it has been checked via two independent signals S6 and S7 that no trailer 2.*n* is actually coupled to the towing vehicle 1. Otherwise, the first combination vehicle braking strategy 18*ga* (15*b*, 15*c*, 15*e*) is selected, which leads to control of the brakes of the trailer 2.*n* via the trailer control signal S2 and of the towing vehicle 1 via the towing vehicle control signal S1 under the assumption that instabilities are not corrected by trailer stability control 39*a* (corresponding braking force limitation for the trailer 2.*n*, or "redundant" stability-controlled generation of a braking demand 19), or the second combination vehicle braking strategy 18*gb* (15*a*) is selected, in which, comparable to the towing vehicle braking strategy 18*z*, the full braking potential can be exploited, since compensation of instabilities via the trailer stability control 39*a* can be assumed.

The respective comparison results 15*a*, 15*b*, 15*c*, 15*d*, 15*e* can additionally be output to a user interface 25, for example on a display. In particular, important information about the condition of the vehicle 3 can follow from the second comparison result 15*b* (deviating negatively) or the third comparison result 15*c* (deviating positively), that is, in the case of deviating results 12, 23 with regard to a coupled trailer 2.*n*.

It is understood that the foregoing description is that of the preferred embodiments of the invention and that various changes and modifications may be made thereto without departing from the spirit and scope of the invention as defined in the appended claims.

LIST OF REFERENCE SIGNS (PART OF THE
DESCRIPTION)

1 Towing vehicle
2.*n* Trailer
3 Vehicle
6 Vehicle sensor
6*a* Radar sensor
6*b* Camera
6*c* Lidar sensor
6*d* Ultrasonic sensor
6*e* Axle load sensor
6*f* Automated towing hitch 43 coupling sensor
6*g* Articulation angle sensor system
7 Trailer interface
12 Monitoring result
15*a* First comparison result
15*b* Second comparison result
15*c* Third comparison result
15*d* Fourth Comparison result
15*e* Fifth Comparison result
18 Braking strategy
18*ga* First combination vehicle braking strategy
18*gb* Second combination vehicle braking strategy
18*z* Towing vehicle braking strategy
19 Braking demand
19*s* Stabilizing braking demand
20*a* Towing vehicle control line
20*b* Trailer control line
23 Detection Result
24 Trailer detection unit
25 User Interface
29 Receiving unit
30 Monitoring unit
31 Output unit
32 Towing vehicle brake system
33 Trailer brake system
34 Vehicle brake system
35 Towing vehicle control device
35*a* Towing vehicle stability control
37 Towing vehicle brakes
39 Trailer control device
39*a* Trailer stability control
39*b* Trailer ABS control
39*c* Trailer RSC control
41 Trailer brakes
43 Automated towing hitch
AB Trailer brake system type
AN Number of axles
AK Trailer structure
AK1 Semi-trailer
AK2 Drawbar trailer
AS Trailer center of gravity
AZ Trailer load condition
B Control element
D Distance between towing vehicle 1 and trailer 2.*n*
FD Driving dynamics of the trailer 2.*n*
M Number of trailer types
n, i Index
N Number of trailers 2.*n*
S1 Towing vehicle control signal
S2 Trailer control signal
S3 Status signal
S6 Sensor signal
S7 Interface signal
SB Braking demand signal
T.i Trailer type U Vehicle environment 3
X Defect
SK1, SK2, SK3 Monitoring steps
SE1, SE2, SE3 Detection Steps

The invention claimed is:

1. A method for actuating a vehicle brake system of a vehicle, the vehicle having at least one towing vehicle and at least one trailer configured to be coupled to the at least one towing vehicle, the towing vehicle having a trailer interface, wherein interface signals are transmittable via the trailer interface between the at least one towing vehicle and at least one coupled trailer, the method comprising:

reading at least one sensor signal from at least one vehicle sensor, wherein the at least one vehicle sensor is configured to generate the sensor signal in dependence upon whether the at least one trailer is coupled or not;

determining and providing a monitoring result by evaluating the at least one sensor signal, wherein the monitoring result indicates whether or not the at least one trailer is coupled to the at least one towing vehicle;

wherein at least one of the at least one sensor signal and the monitoring result is determined independently of the interface signals that at least one of: act on the trailer interface and are transmitted via the trailer interface in a case of the at least one trailer being coupled;

selecting a braking strategy in dependence upon at least one of the monitoring result and the at least one sensor signal, wherein the braking strategy indicates how the vehicle brake system of the vehicle is actuated; and, actuating the vehicle brake system of the vehicle in dependence upon the selected braking strategy when there is a braking demand.

2. The method of claim 1, wherein the at least one sensor signal is directly or indirectly provided by the at least one vehicle sensor, wherein the at least one vehicle sensor is at least one of a radar sensor, a camera, a lidar sensor, and an ultrasonic sensor.

3. The method of claim 1, wherein the at least one sensor signal is provided directly or indirectly by the at least one vehicle sensor, wherein the at least one vehicle sensor is at least one of an axle load sensor, a coupling sensor of an automated towing hitch, and an articulation angle sensor system.

4. The method of claim 1, wherein the at least one vehicle sensor is at least one of arranged on the vehicle and arranged in an environment of the vehicle.

5. The method of claim 1, wherein:

a towing vehicle braking strategy is selected as the braking strategy if the monitoring result indicates that no trailer is coupled; or, a first combination vehicle braking strategy or a second combination vehicle braking strategy is selected as the braking strategy if the monitoring result indicates that at least one trailer is coupled.

6. The method of claim 5, wherein:

in a case of a selection of the first combination vehicle braking strategy, at least one of a first towing vehicle control signal for braking the at least one towing vehicle and a first trailer control signal for braking the at least one trailer is generated in dependence upon there being a braking demand under the assumption that at least one trailer is coupled and the at least one coupled trailer has no or no functional trailer stability control; or, in a case of a selection of the second combination vehicle braking strategy, at least one of a towing vehicle control signal for braking the at least one towing vehicle and a trailer control signal for braking the at least one trailer is generated in dependence upon there being a braking demand under the assumption that the at least one trailer is coupled and that the at least one coupled trailer has a functional trailer stability control system; or, in a case of a selection of the towing vehicle braking strategy, a towing vehicle control signal is generated for braking the at least one towing vehicle in dependence upon there being a braking demand under the assumption that no trailer is coupled and only the at least one towing vehicle is to be braked; and, wherein a towing vehicle brake system in the at least one towing vehicle is actuated with the towing vehicle control signal and a trailer brake system in the coupled trailer is actuated with the trailer control signal.

7. The method of claim 6, wherein at least one of the at least one towing vehicle control signal for braking the towing vehicle and the trailer control signal for braking the at least one trailer is generated in the case of the selection of the first combination vehicle braking strategy in dependence upon at least one of a number of detected trailers and a trailer type of a detected trailer.

8. The method of claim 7, wherein the at least one of the number of detected trailers and the trailer type is determined in dependence upon the at least one sensor signal of at least one of the at least one vehicle sensor.

9. The method of claim 7, wherein the trailer type of a trailer is determined via at least one of a number of axles of the respective trailer, a trailer configuration of the respective trailer, a trailer brake system type of the respective trailer, a trailer center of gravity of the respective trailer, and a trailer loading condition.

10. The method of claim 5, wherein the vehicle brake system includes a towing vehicle brake system and a trailer brake system; and, in the case of the selection of the towing vehicle braking strategy or the first combination vehicle braking strategy or the second combination vehicle braking strategy, at least one of a towing vehicle control signal for braking the at least one towing vehicle and a trailer control signal for braking the at least one trailer is generated in the towing vehicle brake system of the at least one towing vehicle in order to implement a braking demand, wherein the trailer control signal is transmitted via the trailer interface to the trailer brake system in the at least one trailer.

11. The method of claim 5, wherein the braking demand is at least one of specified and modified in dependence upon the selected braking strategy, and wherein the braking demand is at least one of specified and modified in dependence upon a stabilizing braking demand in the case of a selected first combination vehicle braking strategy in order to ensure stability of at least one of the at least one towing vehicle and the at least one coupled trailer even without trailer stability control or functional trailer stability control.

12. The method of claim 11, wherein the stabilizing braking demand is generated in dependence upon the sensor signal of at least one of the at least one vehicle sensor.

13. The method of claim 5, wherein the monitoring result is compared with a detection result from a trailer detection unit and a comparison result is provided, wherein the braking strategy is additionally selected in dependence upon the comparison result.

14. The method of claim 13, wherein:

a first comparison result is provided as the comparison result if both the monitoring result and the detection result indicate that a trailer is coupled; or, a second comparison result is provided as the comparison result if the monitoring result indicates no coupled trailer and the detection result of the trailer detection unit indicates a coupled trailer with or without the presence of a defect; or, a third comparison result is provided as the comparison result if the monitoring result indicates a coupled trailer and the detection result of the trailer detection unit indicates no coupled trailer; or, a fourth comparison result is provided as the comparison result if both the monitoring result and the detection result indicate that no trailer is coupled; or, a fifth comparison result is provided as the comparison result if the monitoring result indicates that a trailer is coupled and the detection result indicates a coupled trailer with a defect.

15. The method of claim 14, wherein at least one of:

in a case of the first comparison result, the second combination vehicle braking strategy is selected to implement the braking demand;

in a case of the fourth comparison result, the towing vehicle braking strategy is selected to implement the braking demand; and, in a case of the second comparison result or the third comparison result or the fifth comparison result, the first combination vehicle braking strategy is selected to implement the braking demand.

16. The method of claim 13, wherein the monitoring result is determined in a monitoring unit independently of the detection result of the trailer detection unit.

17. The method of claim 13, wherein the detection result is dependent on the interface signals acting on the trailer interface and/or transmitted via the trailer interface in case of a coupled trailer.

18. The method of claim 13, wherein the comparison result is output to a user interface.

19. The method of claim 1, wherein the braking demand is specified manually via a control element or automatically via a braking demand signal.

20. A towing vehicle comprising:

a trailer interface, wherein at least one trailer is couplable to the towing vehicle such that interface signals are transmittable between the towing vehicle and the at least one coupled trailer via said trailer interface;

at least one vehicle sensor configured to generate a sensor signal in dependence upon whether or not the at least one trailer is coupled to the towing vehicle;

a monitoring unit configured to evaluate said sensor signal and, in dependence upon the evaluation of said sensor signal, to provide a monitoring result indicating whether or not the at least one trailer is coupled to the towing vehicle;

wherein at least one of said sensor signal and said monitoring result can be determined independently of said interface signals which at least one of: can act on said trailer interface and can be transmitted via said trailer interface in a case of at least one coupled trailer; and, a towing vehicle brake system for braking the towing vehicle in dependence upon a braking demand and a braking strategy, wherein the braking strategy is selectable in dependence upon at least one of said monitoring result and said sensor signal.

* * * * *